(12) United States Patent
Mazzini et al.

(10) Patent No.: US 8,078,053 B1
(45) Date of Patent: Dec. 13, 2011

(54) OPTICAL LINK CHARACTERIZATION

(75) Inventors: Marco Mazzini, Sesto San Giovanni (IT); Carlo Tosetti, Miano (IT); Carlo Mariotti, Monza (IT)

(73) Assignee: Cisco Technology, Inc., San Jose, CA (US)

( * ) Notice: Subject to any disclaimer, the term of this patent is extended or adjusted under 35 U.S.C. 154(b) by 721 days.

(21) Appl. No.: 12/234,179

(22) Filed: Sep. 19, 2008

(51) Int. Cl.
*H04B 10/08* (2006.01)
*H04J 14/02* (2006.01)
*H04B 10/12* (2006.01)

(52) U.S. Cl. .............................. 398/28; 398/81; 398/143
(58) Field of Classification Search .............. 398/26–29, 398/81, 143, 147
See application file for complete search history.

(56) References Cited

U.S. PATENT DOCUMENTS 7,715,669 B2 * 5/2010 Cunningham et al. .......... 385/24
2004/0247238 A1 * 12/2004 Argon et al. .................... 385/24

OTHER PUBLICATIONS

IEEE, "Amendment: Media Access Control (MAC) Parameters, Physical Layers, and Management Parameters for 10 Gb/s Operation", IEEE Computer Society, Part 3: Carrier Sense Multiple Access with Collision Detection (CSMA/CD) Access Method and Physical Layer Specifications, IEEE Std 802.3ae™-2002, IEEE Standard for Information technology Telecommunications and information exchange between systems Local and metropolitan area networks Specific requirements, Aug. 30, 2002, 529 pages.
Pondilli, Peter, et al., "Modal Dependence of Bandwidth", CORNING, Optical Fiber, White Paper, WP4169, May 2001, pp. 1-4.

* cited by examiner

*Primary Examiner* — Dawayne Pinkney
(74) *Attorney, Agent, or Firm* — Brake Hughes Bellermann LLP (57) ABSTRACT

Various example embodiments are disclosed. According to one example embodiment, a method may include transmitting a semiconductor laser-generated optical signal from a first end of a multi-mode fiber (MMF) optical link to a second end of the link. The optical signal may have a reference bandwidth at the first end of the link. The method may further include converting the optical signal to an electrical signal. The method may further include analyzing the electrical signal with an electronic dispersion compensator to determine an effective modal bandwidth (EMBW) of the received optical signal. The method may further include analyzing the electrical signal with an electronic dispersion compensator to determine an intersymbol interference (ISI) penalty of the optical link. The method may further include comparing the EMBW and the ISI penalty to predetermined threshold values of a tolerable EMBW and a tolerable ISI penalty, respectively, to characterize the optical link as acceptable or unacceptable for use as a communications link with a predetermined communications protocol.

21 Claims, 4 Drawing Sheets

OPTICAL LINK CHARACTERIZATION

TECHNICAL FIELD

This description relates to characterizing optical links.

BACKGROUND

Optical links, such as multi-mode fibers (MMFs), may be used to transmit data. Some MMF optical links that are generally specified for use only for transmitting communications signals over a limited distance according to a particular communications protocol, which may restrict whether the link can be used in the field to support the particular communications protocol.

DETAILED DESCRIPTION

Overview

According to one general aspect, a method may include transmitting a semiconductor laser-generated optical signal from a first end of a multi-mode fiber (MMF) optical link to a second end of the link. The optical signal may have a reference bandwidth at the first end of the link. The method may further include converting the optical signal to an electrical signal. The method may further include analyzing the electrical signal with an electronic dispersion compensator to determine an effective modal bandwidth (EMBW) of the received optical signal. The method may further include analyzing the electrical signal with an electronic dispersion compensator to determine an intersymbol interference (ISI) penalty of the optical link. The method may further include comparing the EMBW and the ISI penalty to predetermined threshold values of a tolerable EMBW and a tolerable ISI penalty, respectively, to characterize the optical link as acceptable or unacceptable for use as a communications link with a predetermined communications protocol.

According to another general aspect, an apparatus may include a semiconductor laser transmitter, a receiver, an electronic dispersion compensator (EDC), and a comparator. The semiconductor laser transmitter may be configured to transmit an optical signal from a first end of a multi-mode fiber (MMF) optical link to a second end of the link, the optical signal having a reference bandwidth at the first end of the optical link. The receiver may be configured to receive the optical signal at the second end of the optical link, and to convert the optical signal to an electrical signal. The EDC may be configured to determine an effective modal bandwidth (EMBW) of the electrical signal and configured to determine an intersymbol interference (ISI) penalty of the optical link. The comparator may be configured to compare the EMBW and the ISI penalty to predetermined threshold values of a tolerable EMBW and a tolerable ISI penalty, respectively, to characterize the optical link as acceptable or unacceptable for use as a communications link with a predetermined communications protocol.

The details of one or more implementations are set forth in the accompanying drawings and the description below. Other features will be apparent from the description and drawings, and from the claims.

Description of Example Embodiments

Optical links can be used to transmit data between data processing devices (e.g., servers, blades, switches, routers, central processing units, etc.). Multi-mode optical fibers are widely used in optical links because of their relatively low cost compared to single mode optical fibers. Multi-mode optical fibers have been used to provide optical links between data processing devices that communicate via high bandwidth interfaces. For example, multi-mode optical fiber links using 850 nanometer (nm) signals provided by a vertical cavity surface emitting laser (VCSEL) have been used with 10 Gigabit Ethernet (e.g., 10GBASE-SR) and Fiber-Chanel (200-400 and 800-M6-SN-I) interfaces. Other interfaces, such as 10GBASE-LX4 and 10GBASE-LRM interfaces that rely on single mode optical fiber links, are generally more expensive than multi-mode fiber interfaces. A drawback to using a multi-mode optical fiber interface (e.g., 10GBASE-SR), as opposed to a single mode interface (e.g., 10GBASE-LX4 and 10GBASE-LRM), is that multi-mode links are generally specified to be used over shorter distances than single-mode optical links.

Maximum operating ranges of MMF optical links have been determined by the IEEE, which has performed measurements on optical fibers using an LED light source launched via an overfilled launch (OFL) into the fiber to determine a maximum length in which various fibers can be used as an optical link operating under various 10GBASE protocols (e.g., -SR, -LRM, and -LX4), such that an ISI penalty of the link is less than a predetermined threshold value. The maximum allowable lengths, as determined by the IEEE, of the various fibers used with various 10GBASE protocols and using either 850 nm or 1300 nm optical signals is presented below in Table 1. For example, an OM1 fiber operating with 850 nm laser signals and having a 200 MHz/km modal bandwidth, has a maximum operating range of 33 meters when used in a 10GBASE-SR protocol application. In another example, a "fiber distributed data interface (FDDI)-grade" fiber operating with a 1300 nm laser signals and having a 500 MHz/km modal bandwidth has a maximum operating range of 26 meters when used in a 10GBASE-SR protocol application. A fiber operating with 850 nm laser signals and having a 400 MHz/km modal bandwidth has a maximum operating range of 66 meters when used in a 10GBASE-SR protocol application. These maximum allowable distance ranges were determined by the IEEE, such that specific types of fibers shorter than the lengths listed below could be used with the listed communications protocol with 99% reliability. However, the IEEE measurements may be overly conservative and restrictive and may prevent a systems operator from using a less expensive fiber type or less expensive communications protocol to cover a distance that, according to the IEEE data, is not supported. In addition, many legacy communications systems were built using "FDDI-grade" and OM1 fibers, which means that some of these systems cannot be validated for upgrading to use a 10GBASE protocol (e.g., 10GBASE-SR), because their fibers used in the system are longer than the maximum allowable lengths specified by the IEEE for a desired 10GBASE protocol.

TABLE 1

| (OFL) MBW @ 850/1300 nm | Operating range for SR (m) | Operating range for LRM (m) | Operating range for LX4 (m) |
|---|---|---|---|
| 160/500 (FDDI) | 26 | 220 | 300 |
| 200/500 (OM1) | 33 | 220 | 300 |
| 400/400 | 66 | 100 | 240 |
| 500/500 (OM2) | 82 | 220 | 300 |
| 2000/500 (OM3) | 300 | 220 | 300 |

Thus, as described herein, techniques and systems are described for assessing the actual performance capability of fibers in the field using readily available, relatively low-costs circuits and modules. Based on these in-situ assessments a determination can be made as to whether a fiber can be validated for use to transmit signals according to a particular communication protocol, even if the fiber is longer than the IEEE specified maximum for the protocol. A fiber link estimator is disclosed herein that can be used to assess performance characteristics of an individual optical link in the field to determine whether the particular link is qualified for use in a particular application. Then, if the particular fiber meets predetermined performance characteristics, the fiber can be approved for use in an optical link between two or more data processing devices, even if the length of the fiber is greater than would be generally qualified for use as an optical link. Consequently, legacy systems may be reliably qualified for upgrading to a 10GBASE protocol, even if the fibers used in the system are longer than the maximum operating range specified by the IEEE, so long as the fibers satisfy certain measurable performance criteria.

Two relevant performance characteristics of an optical link are the intersymbol interference (ISI) penalty and a modal bandwidth of the fiber. In an example embodiment, a multi-mode optical fiber (MMF) that is qualified for use as an optical link in a particular application may have a maximum allowable ISI penalty for optical signals transmitted from one end of the fiber to the other. The maximum allowable ISI may be based on the type of fiber and/or the length of the fiber used in the optical link. According to standard test protocols (e.g., protocols developed by the IEEE), a modal bandwidth (MBW) of the optical link may be determined based on the transmission of an optical signal generated by a light-emitting diode (LED) that is launched into the optical link via an overfilled launch (OFL), propagated through the link, and then measured at an output end of the link.

Although the OFL method can be quite accurate for determining a MBW of an optical fiber that carries LED signals, characterizing the modal bandwidth of a fiber that carries laser-generated signals based on OFL measurements can be inaccurate when the laser signals are launched via a restricted modal launch (RML) because different optical modes in the fiber are excited via a RML than via an OFL. In particular, the IEEE measurements, which are performed based on an OFL of LED light into a fiber, do not correlate well with bit error rates (BER) of laser-generated signals launched into the fibers via a RML.

Therefore, as discussed in more detail below, an effective modal bandwidth (EMBW) that provides a useful performance metric of an optical link can be defined. An EMBW of an optical link may be considered to be a metric of the information-carrying capacity of a link. Then, the ISI penalty and the EMBW of a particular optical fiber optical link may be determined based on the transmission of a laser signal that is launched into the fiber via a RML, through the fiber, and if the measured ISI penalty and EMBW are below threshold values the link may be qualified for use with a communications protocol. Thus, an operator may, for example, determine whether an optical link is acceptable for a particular application based on a determination the ISI penalty and the EMBW of the optical link.

As explained above, the IEEE measurements and characterizations of multi-mode fiber optical links are based on measurements using an OLF of LED light into the fiber. As seen from data prepared by the IEEE and presented in Table 2 below, the IEEE has defined just one vertical eye closure penalty (VECP), embedded in the stressed receiver sensitivity (SRS) stressor definition of the 802.3ae-2002 standard, in order to ensure compliance at the receiver side of an optical link and to ensure coverage of 99% of installed fibers.

TABLE 2

| MBW @ 850 nm | Operating range for SR (m) | IS penalty (dB) | IEEE VECP for SR (dB) |
|---|---|---|---|
| 160 (FDDI) | 26 | 3.27 | |
| 200 (OM1) | 33 | 3.35 | |
| 400 | 66 | 3.36 | 3.5 |
| 500 (OM2) | 82 | 3.33 | |
| 2000 (OM3) | 300 | 3.02 | |

The VECP defined in the SRS calibration thus represents the ISI penalty of the fiber, plus some other margins taken to normalize different fiber behaviors and specify the receiver side. Modal Bandwidth (MBW) information, on which basis each of the five different ISI values were calculated by the IEEE, is essentially not needed for RX specification. It is important to note that the IEEE defined OFL MBW values only (based on measurements made on LED light) but that the real bandwidth that a VCSEL interface experiences is different (normally higher), because the spatial launch excites low-order modes and some high-order modes only and not all the modes that a LED does. Thus, when an RML is used, the modal bandwidth of the fiber is called the effective modal bandwidth (EMBW).

Figure 1:
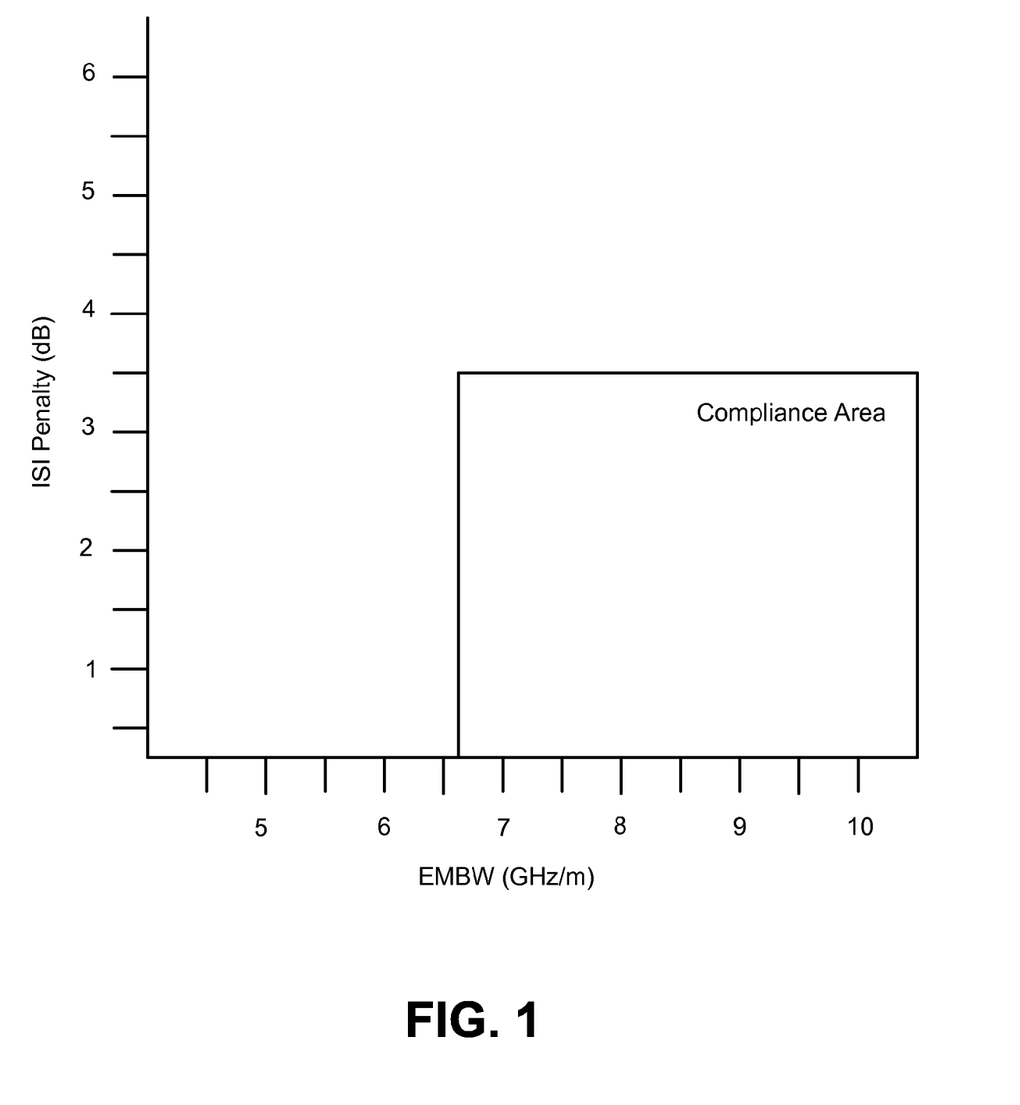
FIG. 1 is a schematic graph showing an allowable operating range of parameters for which an optical link can be used to support a particular communications protocol.

Based on the above considerations, an EMBW for VCSEL interfaces can be correlated with the allowable ISI penalty, and a compliance area can be defined in which the link closure is guaranteed independently from the fiber type. Such a compliance area is shown in FIG. 1. In this way, if the ISI penalty (or VECP) arising from propagation over a particular link is lower than the one specified by IEEE for a particular interface (e.g., an SR interface), the link can meet a condition to be qualified to support the interface, because has been determined to produce better performance then the SRS condition.

From the data in Table 2 above, the worst case of a 3.5 dB ISI penalty can be considered as the Y axis of the compliance area. To calculate the EMBW value to be considered as the worst case threshold value to be used in the compliance area, the normalized EMBW per meter values can be determined by dividing the MBW values by the maximum length values in Table 2. Calculated values are reported in following Table 3.

TABLE 3

| MBW @ 850 nm | Operating range for SR (m) | EMBW/m (GHz/m) | EMBW/m for SR (GHz/m) |
|---|---|---|---|
| 160 (FDDI) | 26 | 6.15 | |
| 200 (OM1) | 33 | 6.06 | |
| 400 | 66 | 6.06 | 6.66 |
| 500 (OM2) | 82 | 6.10 | |
| 2000 (OM3) | 300 | 6.66 | |

Thus, the minimum EMBW/m is 6.66 GHz, which corresponds to the value for OM3 fibers. Although this EMBW/m value is high when compared to the average of the other fibers (about 6.1 GHz/m), the EMBW/m threshold value of 6.66 GHz/m can be adopted as the minimum threshold value for EMBW/m for use in the compliance area to ensure compliance regardless of which kind of fiber is being considered. From a review of FIG. 1, we can say that if the ISI/EMBW values for a particular fiber lie within the compliance area, the fiber under test is a realistic case link for 10GBASE-SR application. Also, if the point lies outside the rectangular area for a fiber, 10GBASE-SR propagation will not be supported by that fiber. It is clear now that this method can be used to screen the fiber link, as can be easily translated to other VCSEL based interfaces.

Figure 2A:
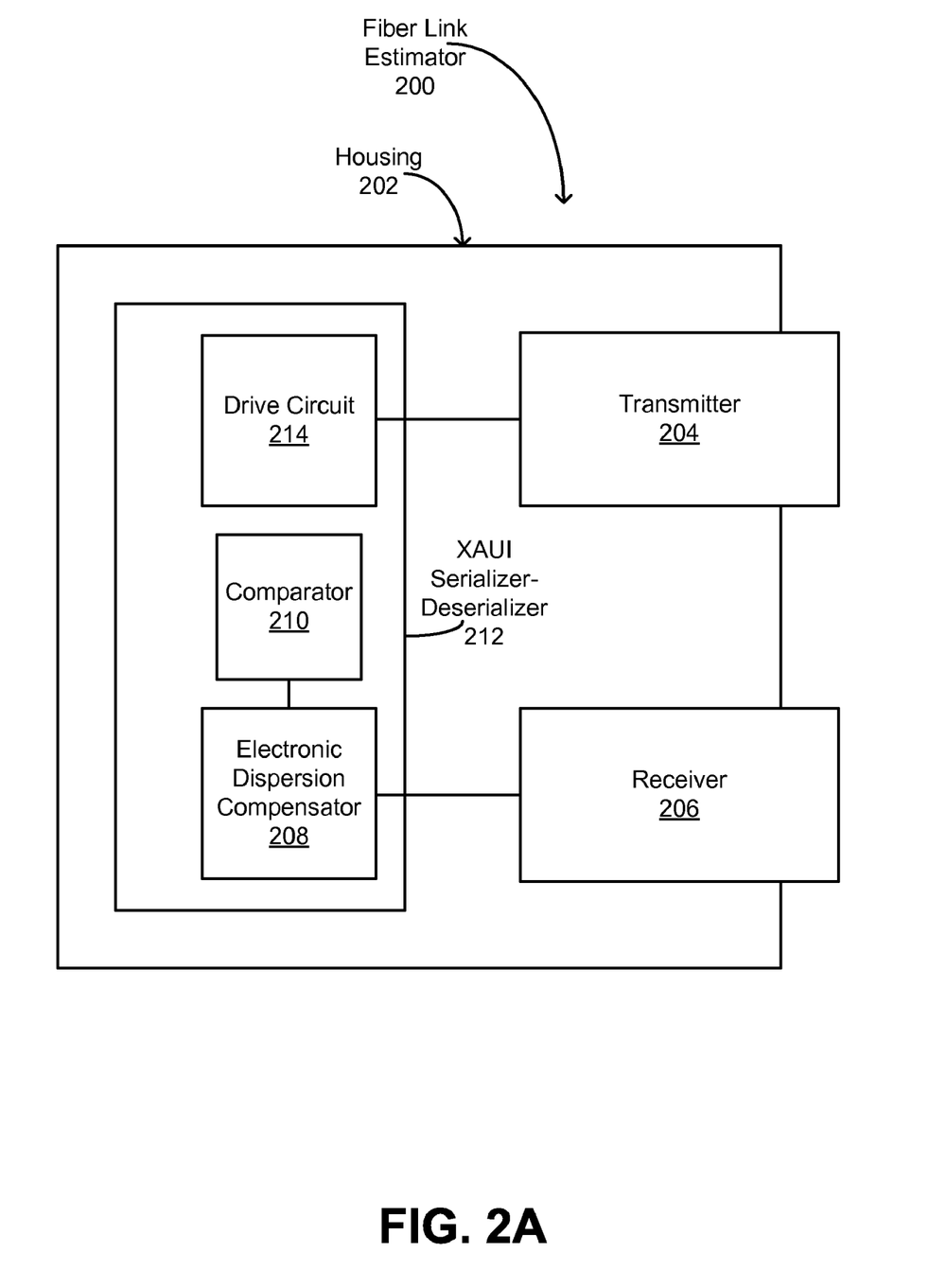
FIG. 2A is a block diagram of a fiber link estimator according to an example embodiment.

FIG. 2A is a block diagram of a fiber link estimator 200 according to an example embodiment that can be used to determine the ISI penalty and the EMBW of an optical link and determine whether the link is qualified for use according to a particular communications protocol. The fiber link estimator 200 may measure and/or estimate characteristics of a multi-mode fiber (MMF) optical link (shown in FIG. 2B). The fiber link estimator 200 may, for example, measure or estimate an effective modal bandwidth (EMBW) of an optical signal received via the optical link. The fiber link estimator 200 may also measure or estimate an intersymbol interference (ISI) penalty of the optical link. The fiber link estimator 200 may characterize the optical link as acceptable or unacceptable for use as a communication link based on the measured EMBW and/or ISI penalty. The characterization may also be based on a predetermined communications protocol, such as a ten Gigahertz (10 GHz) protocol or a ten Gigabit Ethernet-short range (10GBASE-SR) protocol, according to example embodiments.

In an example embodiment, the fiber link estimator 200 may include a housing 202. The housing 202 may enclose any or all of the components of the fiber link estimator 200. The housing 202 may, for example, include an X2-form factor housing, enabling the fiber link estimator 200 to communicate according to a parallel Ten Gigabit Ethernet Attachment Unit Interface (XAUI) protocol, such as via a seventy-pin electrical interface. In another example embodiment, the housing 202 may include a small form factor pluggable (SFP or SFP+) module with an electrical interface that operates according to a serial protocol, and that includes a twenty-pin electrical interface that plugs into a small form factor (SFF) host connector. The electrical interface of an SFP housing may operate according to a Serial Gigabit Media Independent Interface (SGMII), whereas the electrical interface of an SFP+ housing may operate according to a serializer-deserializer Framer Interface (SFI) protocol. In example embodiments, the housing 202 may allow the fiber link estimator 200 to incorporate into a router or a switch, such as a router or switch with an X2 or SFP/SFP+ form factor.

In an example embodiment, the fiber link estimator 200 may include a transmitter 204, which can include 2 a semiconductor laser transmitter, such as, for example, a vertical cavity surface emitting laser (VCSEL). The transmitter 204 may be, for example, configured to transmit an optical signal from a first end of a MMF optical link to a second end of the optical link. The semiconductor laser transmitter, e.g., the VCSEL, may provide, for example, an output signal having a wavelength of about 850 nanometers. The transmitter 204 may launch the optical signal into the optical link via a restricted modal launch (RML). In an example embodiment, the transmitter 204 may be a VCSEL transmitter optical subassembly (TOSA).

The fiber link estimator 200 may also include a receiver 206. The receiver 206 may be configured to receive an optical signal at a second end of an optical link, which may or may not be the same optical link that the transmitter 204 transmits the optical signal into. The receiver 206 may, for example, be configured to convert the received optical signal into an electrical signal. The receiver 206 may, for example, include a linear 850 nanometer receiver optical subassembly (ROSA) that is configured to receive the optical signal and convert the optical signal into an electrical signal that is an electrical analog of the optical signal.

The receiver 206 may be coupled to an electronic dispersion compensator (EDC) 208. The receiver 206 may pass the electrical signal to the EDC 208, which then analyzes the electrical signal. The EDC 208 may analyze the electrical signal to determine an effective modal bandwidth (EMBW) of the received optical signal and the intersymbol interference (ISI) penalty of the optical link via which the optical signal was received. The EDC can plot the entire eye diagram of the received signal, because the EDC can extract the clock signal from the received signal and sample the eye by changing the phase delay of the signal to extract the ISI penalty.

In an example embodiment, the EDC 208 may determine the EMBW of the received optical signal by performing a fast Fourier transform (FFT) on the electrical signal that is an analog of the optical signal (i.e., the electrical signal that is converted from the received optical signal). The EDC 208 may also determine a frequency response of the MMF optical link based at least in part on the FFT and a reference bandwidth for the signal. The reference bandwidth may be a predetermined parameter, or may be communicated to the fiber link estimator 200 by a transmitting device, such as another fiber link estimator.

In one implementation, the reference bandwidth may be determined by coupling together a pair of fiber link estimators with a very short optical fiber to form a communications system having one estimator at a first end and a second estimator at a second end. Then, the reference bandwidth of a signal generated by the first estimator can be taken as equal to the bandwidth that is received by the second estimator over the very short optical fiber. In another implementation, the reference bandwidth may be provided by a reference TOSA that can be, for example, including in the estimator 200. The reference TOSA can be designed to simulate either the average behavior of particular transmitters (e.g., SR transmitters) or the worst-case scenario for a transmitter. The reference transmitter also can be replaced by any other transmitter, for example, a transmitter from a device installed in the field. In this latter implementation the estimator 200 would act as a uni-directional device.

The fiber link estimator 200 may compare either or both of the EMBW and the ISI penalty to predetermined threshold values of a tolerable EMBW and a tolerable ISI penalty. In an example embodiment, the fiber link estimator 200 may include a comparator 214. The comparator 214 may be coupled to, or included in, the EDC 208. The comparator 214 may compare either or both of the EMBW and the ISI penalty to predetermined threshold values of the tolerable EMBW and the tolerable ISI penalty. The comparator 214 may, for example, characterize the optical link as acceptable or unacceptable for use as a communications link with a predetermined communications protocol based on the comparison.

The fiber link estimator 200 may also include a Ten Gigabit Ethernet Attachment Unit Interface (XAUI) serializer-deserializer 212. The XAUI serializer-deserializer 212 may be coupled to the comparator 210 and/or to the EDC 208. The XAUI serializer-deserializer 212 may be configured to convert data between the SGMII or SFI protocol (such as data received from or sent to either an SFP module or an SFP+ module) and the XAUI protocol. For example, if the data embedded in the optical signal received by the receiver 206 was transmitted according to the XAUI protocol, the XAUI serializer-deserializer 212 may convert the data to either the SGMII protocol or the SFI protocol. Or, if the data embedded in the optical signal received by the receiver 206 was transmitted according either the SGMII protocol or the SFI protocol, the XAUI serializer-deserializer 212 may convert the data to the XAUI protocol.

In an example embodiment, the housing 202 may include an X2 form factor housing enclosing at least the transmitter 204, the receiver 206, and the EDC 208. In an example embodiment, the housing 202 may include a SFP+ form factor housing enclosing at least the transmitter 204 and the receiver 206.

Figure 2B:
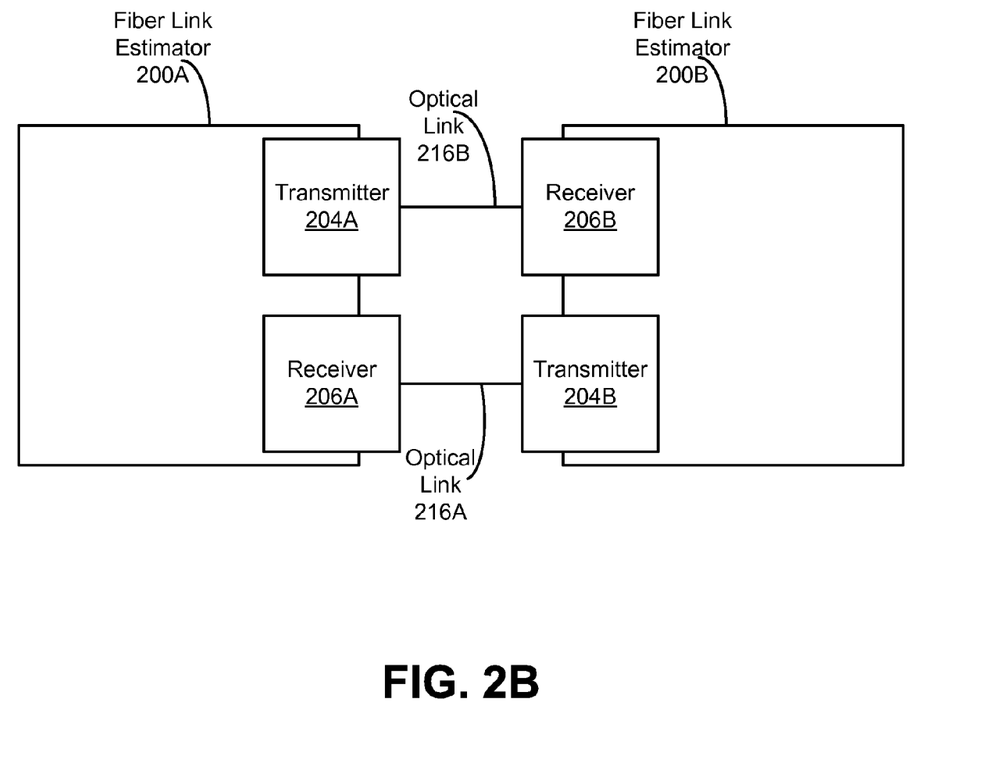
FIG. 2B is a block diagram of two fiber link estimators coupled via optical links according to an example embodiment.

FIG. 2B is a block diagram of two fiber link estimators 200A, 200B coupled via optical links 216A, 216B according to an example embodiment. In this example, a transmitter 204B of a second fiber link estimator 200B may transmit an optical signal to a receiver 206A of a first fiber link estimator 200A via a first optical link 216A. A transmitter 204A of the first fiber link estimator 200A may transmit an optical signal to a receiver 206B of the second fiber link estimator 200B via a second optical link 216B. The transmitters 204A, 204B may generate and transmit the optical signal as described above with reference to FIG. 2A. The receivers 206A, 206B may receive and process the optical signal as described above with reference to FIG. 2A. The fiber link estimators 200A, 200B may characterize the optical links 216A, 216B as described above with reference to FIG. 2A.

Figure 3:
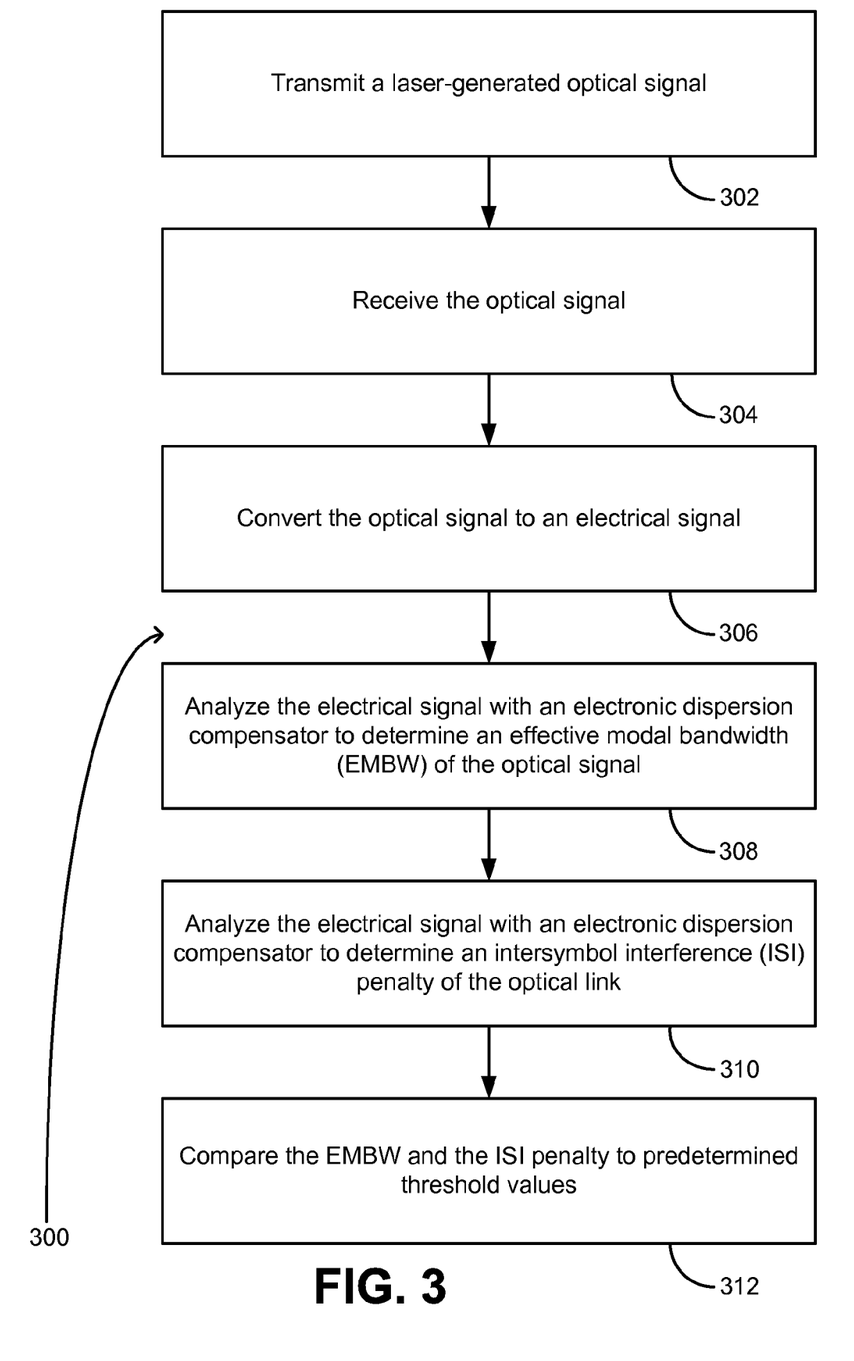
FIG. 3 is a flowchart showing a method according to an example embodiment.

FIG. 3 is a flowchart showing a method 300 according to an example embodiment. According to this example, the method 300 may include transmitting a semiconductor laser-generated optical signal from a first end of a multi-mode fiber (MMF) optical link 316 to a second end of the link 316 (202). The optical signal may have a reference bandwidth at a first end of the link 316.

The method 300 may also include receiving the optical signal at the second end of the link (304). The method 200 may also include converting the optical signal to an electrical signal (306). The method 200 may also include analyzing the electrical signal with an electronic dispersion compensator (EDC) 208 to determine an effective modal bandwidth (EMBW) of the received optical signal (308). The method 200 may also include analyzing the electrical signal with the EDC 208 to determine an intersymbol interference (ISI) penalty of the optical link (310). The method 200 may also include comparing the EMBW and the ISI penalty to predetermined threshold values of a tolerable EMBW and a tolerable ISI penalty, respectively, to characterize the optical link 216 as acceptable or unacceptable for use as a communications link with a predetermined communications protocol (312).

In an example embodiment, the transmitted optical signal may be generated by a vertical cavity surface emitting laser (VCSEL) having an output wavelength of about 850 nanometers.

In an example embodiment, the optical signal may be transmitted by launching the optical signal into the optical link 216 using a restricted modal launch (RML).

In an example embodiment, analyzing the electrical signal with the EDC 208 to determine the EMBW of the received optical signal may include performing a fast Fourier transform (FFT) of the electrical signal, and determining a frequency response of the MMF optical link based at least in part on the FFT and the reference bandwidth.

In an example embodiment, the predetermined communications protocol may be a 10 Gigahertz (10 GHz) communications protocol.

In an example embodiment, the predetermined communications protocol may be a ten Gigabit Ethernet-short range (10GBASE-SR) communications protocol.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:
1. A method comprising:
 transmitting a semiconductor laser-generated optical signal from a first end of a multi-mode fiber (MMF) optical link to a second end of the link, wherein the optical signal has a reference bandwidth at the first end of the link;

receiving the optical signal at the second end of the link;
converting the optical signal to an electrical signal;
analyzing the electrical signal with an electronic dispersion compensator to determine an effective modal bandwidth (EMBW) of the received optical signal;
analyzing the electrical signal with the electronic dispersion compensator to determine an intersymbol interference penalty of the optical link; and
comparing the EMBW and the ISI penalty to predetermined threshold values of a tolerable EMBW and a tolerable ISI penalty, respectively, to characterize the optical link as acceptable or unacceptable for use as a communications link with a predetermined communications protocol.

2. The method of claim 1, further comprising generating the optical signal with a vertical cavity surface emitting laser (VCSEL) having an output wavelength of about 850 nanometers.

3. The method of claim 1, further comprising launching the optical signal into the optical link using a restricted modal launch (RML).

4. The method of claim 1, wherein analyzing the electrical signal with the electronic dispersion compensator to determine the EMBW of the received optical signal includes:
performing a fast Fourier transform (FFT) on the electrical signal; and
determining a frequency response of the MMF optical link based at least in part on the FFT and the reference bandwidth.

5. The method of claim 1, wherein the predetermined communications protocol is a 10-GHz communications protocol.

6. The method of claim 1, wherein the predetermined communications protocol is a 10GBASE-SR communications protocol.

7. An apparatus comprising:
a semiconductor laser transmitter configured to transmit an optical signal from a first end of a multi-mode fiber (MMF) optical link to a second end of the link, the optical signal having a reference bandwidth at the first end of the optical link;
a receiver configured to receive the optical signal at the second end of the optical link, and to convert the optical signal to an electrical signal;
an electronic dispersion compensator (EDC) configured to determine an effective modal bandwidth (EMBW) of the electrical signal and configured to determine an inter-signal interference (ISI) penalty of the optical link; and
a comparator configured to compare the EMBW and the ISI penalty to predetermined threshold values of a tolerable EMBW and a tolerable ISI penalty, respectively, to characterize the optical link as acceptable or unacceptable for use as a communications link with a predetermined communications protocol.

8. The apparatus of claim 7, wherein the laser is a vertical-cavity surface-emitting laser (VCSEL) having an output wavelength of about 850 nm.

9. The apparatus of claim 8, wherein the predetermined communications protocol is a 10 GHz communications protocol.

10. The apparatus of claim 7, wherein the transmitter is configured to launch the optical signal into the MMF optical link via a restricted modal launch (RML).

11. The apparatus of claim 7, wherein the receiver includes a linear 850 nanometer receiver optical subassembly (ROSA) configured to receive the optical signal and to convert the optical signal into an electrical signal.

12. The apparatus of claim 7, wherein the EDC is configured to determine the EMBW of the optical signal based at least in part by:
performing a fast Fourier transform (FFT) on the electrical signal to determine a frequency response of MMF optical link; and
determining a frequency response of the MMF optical link based at least in part on the FFT and the reference bandwidth.

13. The apparatus of claim 7, further comprising a Ten Gigabit Ethernet Attachment Unit Interface (XAUI) serializer-deserializer coupled to the EDC.

14. The apparatus of claim 7, further comprising an X2 form factor housing enclosing at least the laser transmitter, the receiver, and the EDC.

15. The apparatus of claim 7, further comprising an SFP+ form factor housing enclosing at least the laser transmitter and the receiver.

16. The apparatus of claim 7, wherein the predetermined communications protocol is a 10GBASE-SR communications protocol.

17. An apparatus comprising:
a receiver configured to receive at a second end of a multi-mode fiber (MMF) optical link an optical signal transmitted by a semiconductor laser transmitter at a first end of the optical link and to convert the optical signal to an electrical signal, the optical signal having a reference bandwidth at the first end of the optical link;
an electronic dispersion compensator (EDC) configured to determine an effective modal bandwidth (EMBW) of the electrical signal and configured to determine an inter-signal interference (ISI) penalty of the optical link; and
a comparator configured to compare the EMBW and the ISI penalty to predetermined threshold values of a tolerable EMBW and a tolerable ISI penalty, respectively, to characterize the optical link as acceptable or unacceptable for use as a communications link with a predetermined communications protocol.

18. The apparatus of claim 17, wherein the laser is a vertical-cavity surface-emitting laser (VCSEL) having an output wavelength of about 850 nm.

19. The apparatus of claim 17, wherein the EDC is configured to determine the EMBW of the optical signal based at least in part by:
performing a fast Fourier transform (FFT) on the electrical signal to determine a frequency response of MMF optical link; and
determining a frequency response of the MMF optical link based at least in part on the FFT and the reference bandwidth.

20. The apparatus of claim 17, further comprising a Ten Gigabit Ethernet Attachment Unit Interface (XAUI) serializer-deserializer coupled to the EDC.

21. The apparatus of claim 17, wherein the predetermined communications protocol is a 10GBASE-SR communications protocol.

* * * * *

UNITED STATES PATENT AND TRADEMARK OFFICE
CERTIFICATE OF CORRECTION

| | | |
|---|---|---|
| PATENT NO. | : 8,078,053 B1 | Page 1 of 1 |
| APPLICATION NO. | : 12/234179 | |
| DATED | : December 13, 2011 | |
| INVENTOR(S) | : Marco Mazzini et al. | |

It is certified that error appears in the above-identified patent and that said Letters Patent is hereby corrected as shown below:

On the Title page, in field (75), in "Inventors", in column 1, line 2, delete "Miano" and insert -- Milano --, therefor.

Signed and Sealed this
Fourteenth Day of February, 2012

David J. Kappos
*Director of the United States Patent and Trademark Office*